US011255297B2

(12) United States Patent
Krausche

(10) Patent No.: US 11,255,297 B2
(45) Date of Patent: Feb. 22, 2022

(54) VEHICLE SYSTEM AND A METHOD FOR SUCH VEHICLE SYSTEM

(71) Applicant: Volvo Truck Corporation, Gothenburg (SE)

(72) Inventor: Sebastian Krausche, Höllviken (SE)

(73) Assignee: Volvo Truck Corporation, Gothenburg (SE)

(*) Notice: Subject to any disclaimer, the term of this patent is extended or adjusted under 35 U.S.C. 154(b) by 0 days.

(21) Appl. No.: 16/624,848

(22) PCT Filed: Jun. 15, 2018

(86) PCT No.: PCT/EP2018/065965
§ 371 (c)(1),
(2) Date: Dec. 19, 2019

(87) PCT Pub. No.: WO2019/001989
PCT Pub. Date: Jan. 3, 2019

(65) Prior Publication Data
US 2020/0141364 A1   May 7, 2020

(30) Foreign Application Priority Data

Jun. 30, 2017 (WO) .............. PCT/EP2017/066298

(51) Int. Cl.
*F01N 9/00* (2006.01)
*F02M 26/05* (2016.01)
(Continued)

(52) U.S. Cl.
CPC ............ *F02M 26/05* (2016.02); *F01N 9/005* (2013.01); *F02M 26/15* (2016.02); *F02M 26/20* (2016.02)

(58) Field of Classification Search
CPC ........ F01N 9/005; F02B 37/004; F02B 41/10; F02D 41/0007; F02D 41/005;
(Continued)

(56) References Cited

U.S. PATENT DOCUMENTS 6,973,786 B1   12/2005   Liu et al.
2005/0224060 A1   10/2005   Hill et al.
(Continued)

FOREIGN PATENT DOCUMENTS

CN   101624948 A   1/2010
CN   105422324 A   3/2016
(Continued)

OTHER PUBLICATIONS

International Search Report and Written Opinion for International Patent Application No. PCT/EP2018/065965, dated Jul. 23, 2018, 14 pages.
(Continued)

*Primary Examiner* — Aubrey B. Walter
*Assistant Examiner* — Dapinder Singh
(74) *Attorney, Agent, or Firm* — Withrow & Terranova, PLLC

(57) ABSTRACT

The invention relates to a method for a vehicle system (100) comprising an internal combustion engine (10) having a turbocharger unit (110) connected thereto, a turbocompound unit (120) arranged to receive exhaust gas flowing from the turbocharger unit (110), and an exhaust gas recirculation system (130). The method comprises controlling the exhaust gas flowing through the exhaust gas recirculation system (130) by determining a pressure difference, and, if the determined pressure difference is above a predetermined threshold value directing the recirculated exhaust gas to an air intake line (160) downstream a charge air cooler (170), and, if the determined pressure difference is not above the
(Continued)

predetermined threshold value directing the recirculated exhaust gas to a compressor (114) of the turbocharger unit (110).

15 Claims, 3 Drawing Sheets

(51) Int. Cl.
*F02M 26/10* (2016.01)
*F02M 26/20* (2016.01)
*F02B 37/00* (2006.01)
*F02D 41/00* (2006.01)
*F02M 26/15* (2016.01)

(58) Field of Classification Search
CPC ............ F02D 41/0065; F02D 41/1448; F02D 2200/0406; F02M 26/05; F02M 26/07; F02M 26/22; F02M 26/71; F02M 26/15; F02M 26/20; Y02T 10/12; Y02T 10/40
USPC .................................................. 60/602, 605.2
See application file for complete search history.

(56) References Cited

U.S. PATENT DOCUMENTS

| | | | |
|---|---|---|---|
| 2007/0125081 A1 | 6/2007 | Czarnowski et al. | |
| 2007/0186536 A1 | 8/2007 | Hashizume | |
| 2008/0127645 A1 | 6/2008 | Easley et al. | |
| 2008/0149078 A1* | 6/2008 | Hill | F02B 43/00 123/568.11 |
| 2010/0010728 A1* | 1/2010 | Stein | F02M 26/71 701/108 |
| 2011/0000470 A1 | 1/2011 | Roth | |
| 2011/0302918 A1 | 12/2011 | Vollmer et al. | |
| 2012/0046854 A1* | 2/2012 | Sangkyu | F02D 41/0057 701/108 |
| 2013/0298553 A1 | 11/2013 | Lim et al. | |
| 2015/0047317 A1* | 2/2015 | Ulrey | F02M 26/19 60/273 |
| 2016/0040607 A1 | 2/2016 | Ku et al. | |
| 2016/0348615 A1* | 12/2016 | Fischer | F02M 26/22 |
| 2017/0328263 A1* | 11/2017 | Uhrich | F01P 3/20 |
| 2018/0003133 A1* | 1/2018 | McHenry | F02B 37/005 |
| 2019/0063351 A1* | 2/2019 | Zeng | F02B 37/24 |
| 2019/0170050 A1* | 6/2019 | Uhrich | F02B 37/183 |

FOREIGN PATENT DOCUMENTS

| | | |
|---|---|---|
| DE | 3807372 A1 | 9/1989 |
| DE | 10116643 A1 | 10/2002 |
| DE | 102005052496 A1 | 5/2007 |
| DE | 60309972 T2 | 6/2007 |
| DE | 102011011637 A1 | 9/2012 |
| DE | 102015008736 A1 | 1/2017 |
| EP | 2395224 A2 | 12/2011 |
| WO | 2014022208 A1 | 2/2014 |
| WO | 2015066671 A2 | 5/2015 |
| WO | 2016206720 A1 | 12/2016 |

OTHER PUBLICATIONS

International Preliminary Report on Patentability for International Patent Application No. PCT/EP2018/065965, dated Nov. 11, 2019, 17 pages.
International Search Report and Written Opinion for International Patent Application No. PCT/EP2017/066298, dated Aug. 29, 2017, 13 pages.
International Preliminary Report on Patentability for International Patent Application No. PCT/EP2017/066298, dated Jan. 9, 2020, 11 pages.
First Office Action for Chinese Patent Application No. 201880042925.9, dated Mar. 1, 2021, 15 pages.
Ntention to Grant for European Patent Application No. 18731832.4, dated May 28, 2021, 18 pages.

* cited by examiner

VEHICLE SYSTEM AND A METHOD FOR SUCH VEHICLE SYSTEM

This application is a 35 USC 371 national phase filing of International Application No. PCT/EP2018/065965, filed Jun. 15, 2018, which claims priority to International Application No. PCT/EP2017/066298, filed Jun. 30, 2017, the disclosures of which are incorporated herein by reference in their entireties.

TECHNICAL FIELD

The invention relates to a method for a vehicle system comprising an internal combustion engine having a turbocharger unit and a turbocompound unit connected thereto, as well as to a vehicle system as such.

The invention can be applied in heavy-duty vehicles, such as trucks, buses and construction equipment. Although the invention will be described with respect to a truck, the invention is not restricted to this particular vehicle, but may also be used in other applications.

BACKGROUND

A turbocompound unit is a vehicle component used for recovering a part of the energy of the exhaust gas flow of an internal combustion engine and to convert that energy into a rotational movement of a shaft. The rotational movement of the shaft is transferred as a torque increase to the crankshaft of the vehicle. Typically the turbocompound unit is positioned downstream a turbocharger unit.

Internal combustion engines may also be configured to allow for exhaust gas recovery (EGR) in order to reduce emissions of nitrogen oxide ($NO_x$). As the $NO_x$ formation increase at higher temperature, mixing incoming air with exhaust gas will increase the heat capacity of the fuel gas mixture at a given equivalence ratio thus reducing the temperature during the combustion. As a result, the amount of $NO_x$ will decrease.

US2008127645 describes a vehicle system having a turbocompound unit arranged in series with a turbocharger unit. The vehicle system is provided with an EGR system allowing for exhaust gases to be directed to the intake air. The amount of EGR is controlled by a mixing valve.

The above-described vehicle system will most likely have good drive pressure for EGR in most operating points due to the extra expansion in the turbine of the turbocompound unit. However this is not true for all operating points. Especially at low load and low engine speed a vehicle system being equipped with a turbocompound unit, along with a fuel optimized high efficiency turbocharger, will suffer from insufficient drive pressure for the EGR. This will result in limitations and less degree of freedom not only in the matching of the turbocompound/turbocharger system, but also for the optimization of the entire vehicle system resulting in non-optimal fuel consumption.

An improved vehicle system, as well as a method for such vehicle system, would therefore be desirable.

SUMMARY

According to a first aspect of the invention, the object is achieved by a method according to claim 1. According to a second aspect of the invention, the object is achieved by a computer program according to claim 5. According to a third aspect of the invention, the object is achieved by a computer readable medium according to claim 6. According to a fourth aspect of the invention, the object is achieved by a vehicle system according to claim 7. According to a fifth aspect of the invention, the object is achieved by a vehicle according to claim 19.

An object of the invention is therefore to provide a method which comprises the step of determining the pressure difference between the exhaust gas manifold and the air intake line downstream the charge air cooler. This pressure difference is normally denoted the normal drive pressure for exhaust gas recirculation. If the determined pressure difference is above a predetermined threshold value the recirculated exhaust gas is directed to an air intake line downstream a charge air cooler, and, if the determined pressure difference is not above the predetermined threshold value the recirculated exhaust gas is directed to a compressor of the turbocharger unit.

The pressure difference may be determined e.g. by real-time measurements, or predictive assumptions, or engine mapping, or any other suitable way (open and/or closed loop).

By directing the recirculated exhaust gas depending on the pressure difference, sufficient EGR level is enabled for all operating points of the vehicle system.

In an embodiment directing the recirculated exhaust gas to a compressor of the turbocharger unit is performed by directing the recirculated exhaust gas to a position upstream the compressor. Alternatively, directing the recirculated exhaust gas to a compressor of the turbocharger unit is performed by directing the recirculated exhaust gas into a diffuser part of the compressor where the velocity of the air creates a lower static pressure and thereby increases the drive pressure for the exhaust gas.

In an embodiment the method comprises bypassing the charge air cooler by directing the intake air, as well as the exhaust gas previously being directed to the compressor, to a position downstream the charge air cooler. Hence the exhaust gas temperature is kept as high as possible. Additionally deterioration of the charge air cooler is reduced.

According to a second aspect a computer program is provided. The computer program comprises program code means for performing the steps of the method according to the first aspect when said program is run on a computer.

According to a third aspect a computer readable medium carrying a computer program is provided. The computer program comprises program code means for performing the steps of the method according to the first aspect when said program product is run on a computer.

According to a fourth aspect a vehicle system is provided. The vehicle system comprises an internal combustion engine having a turbocharger unit connected thereto and a turbocompound unit arranged to receive exhaust gas flowing from the turbocharger unit. The vehicle system further comprises an exhaust gas recirculation system comprising an exhaust gas recirculation line having a cooler and connecting with an air intake line downstream a charge air cooler. The exhaust gas recirculation line further comprises a valve arranged downstream the cooler and configured to direct at least a part of the exhaust gas flowing through the exhaust gas recirculation line to a compressor of the turbocharger unit.

In an embodiment the vehicle system comprises a control unit being connected to said valve and configured to control said valve based on a pressure difference between the exhaust gas manifold and the air intake line downstream the charge air cooler. Efficient and robust direction control of the exhaust gas is thereby achieved.

The valve may be configured to direct at least a part of the exhaust gas flowing through the exhaust gas recirculation line to a position upstream the compressor of the turbocharger unit. Alternatively, the valve is configured to direct at least a part of the exhaust gas flowing through the exhaust gas recirculation line to a diffuser of the compressor of the turbocharger unit. The EGR drive pressure of the exhaust gas is thereby increased.

In an embodiment the air intake line is provided with a bypass valve arranged upstream the charge air cooler and configured to direct the intake air, as well as the exhaust gas, to a position downstream the charge air cooler. Hence the exhaust gas temperature becomes as high as possible for the downstream after treatment system. Additionally deterioration of the charge air cooler is reduced.

In an embodiment the control unit is further configured to control the bypass valve. Efficient use of the control unit is thereby accomplished.

In an embodiment the valve is a three-way valve being moveable between a closed position in which exhaust gas is prevented to flow through said valve, a first position in which exhaust gas is directed to the air intake line downstream the charge air cooler, and a second position in which exhaust gas is directed to the compressor of the turbocharger unit. Hence a single component is used to control how the exhaust gas is recirculated.

The valve may be moveable between a plurality of intermediate positions arranged between the closed position, the first position, and the second position. Continuous control of the exhaust gas recirculation is thus allowed.

The exhaust gas recirculation line may comprise a main branch connecting to the air intake line downstream the charge air cooler, and an auxiliary branch directing recirculated exhaust gas to the compressor. In such embodiment the valve is a two-way valve being moveable between a closed position in which exhaust gas is prevented to flow through said valve, and an open position in which exhaust gas is directed to the auxiliary branch. A simple construction and control is thereby provided.

In an embodiment the vehicle system further comprises a recirculation valve arranged upstream the EGR cooler, whereby the amount of recirculated exhaust gas can be controlled.

In an embodiment the two-way valve is moveable between a plurality of intermediate positions arranged between the closed position and the open position. Continuous control of the exhaust gas recirculation is thus allowed.

According to a fifth aspect a vehicle is provided. The vehicle comprises a vehicle system according to the fourth aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
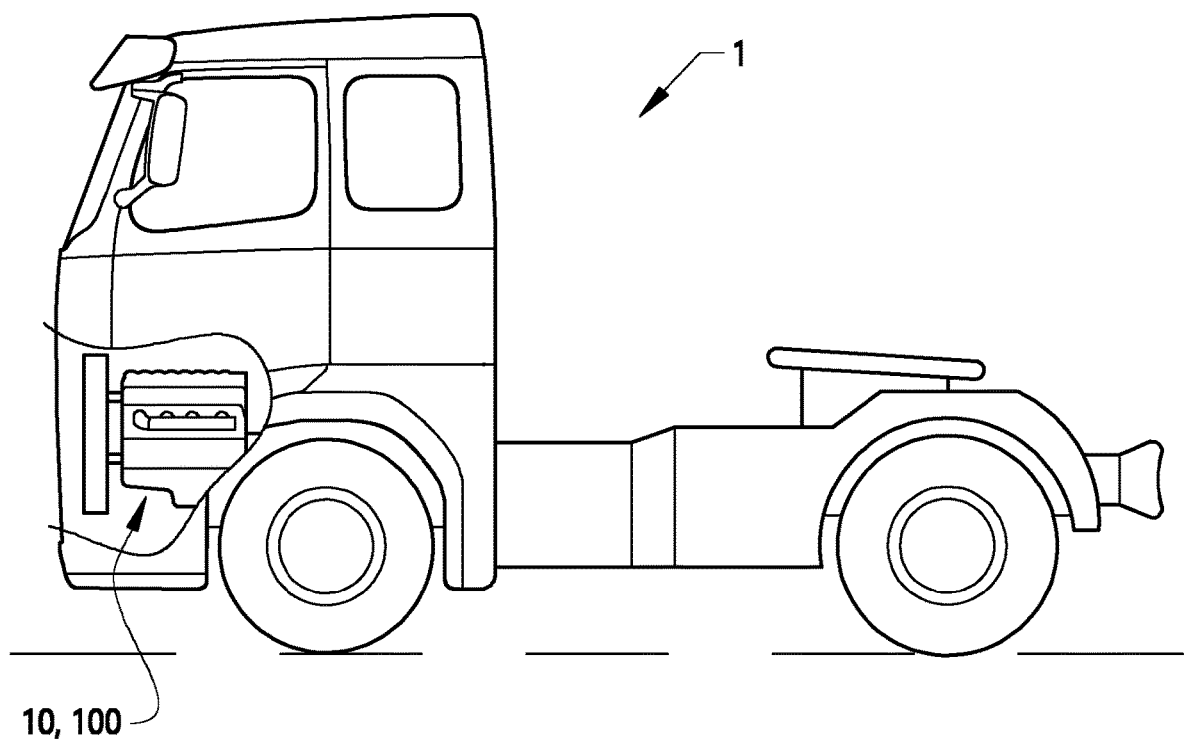
FIG. 1 is a side view of a vehicle according to an embodiment.

Starting with FIG. 1 a vehicle 1 is shown. The vehicle 1, which is illustrated as a truck, has an internal combustion engine 10 for driving the vehicle 1. As will be further explained in the following the internal combustion engine 10 of the vehicle 1 forms part of a vehicle system 100 according to various embodiments. The vehicle 1 may have additional propulsion units, such as electric drives etc. as long as it has at least one engine providing a flow of exhaust gases. Hence the vehicle 1 is not exclusively a truck but may also represent various heavy duty vehicles such as buses, constructional equipment, etc.

Figure 2:
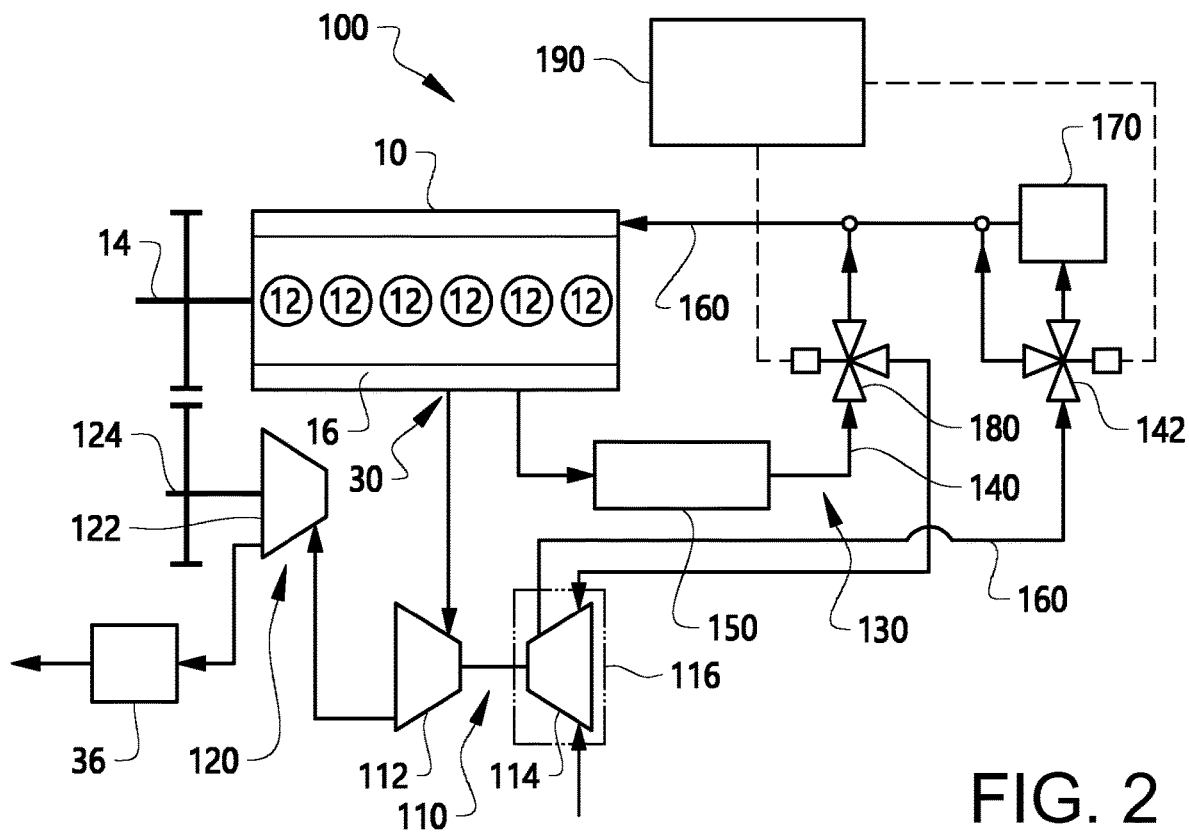
FIG. 2 is a schematic view of a vehicle system according to an embodiment.

In FIG. 2 an embodiment of such vehicle system 100 is shown in more details. The vehicle system includes an engine 10 having a plurality of cylinders 12 operated to combust fuel, such as diesel or gasoline, whereby the motion of pistons reciprocating in the cylinders 12 is transmitted to a rotation movement of a crank shaft 14. The crank shaft 14 is further coupled to a transmission (not shown) for providing a torque to driving elements (not shown). In case of a heavy vehicle, such as a truck, the driving elements are wheels; however the vehicle system may also be used for other equipment such as construction equipment, marine applications, etc.

The vehicle system further comprises a turbocharger unit 110. The turbocharger unit 110 receives exhaust gases from the internal combustion engine 10, wherein the flow of exhaust gases is used to drive a turbine 112 of the turbocharger 110. A compressor 114 will rotate with the turbine 112 for compressing intake air and the intake air is fed to the internal combustion engine 10 by means of an air intake line 160. The air intake line 160 extends from the outlet of the compressor 114 to the air intake of the internal combustion engine 10, preferably via a charge air cooler 170.

A turbocompound unit 120 is arranged downstream the turbocharger unit 110, i.e. the exhaust gas passes the turbocharger unit 110 prior to passing the turbocompound unit 120. The exhaust gas thus exits the turbocharger unit 110 and flows to the turbocompound unit 120, optionally via an exhaust gas regulator (not shown). The incoming exhaust gas, from which some energy have already been used to drive the turbine 112 of the turbocharger unit 110, is guided to pass a turbine wheel 122 of the turbocompound unit 120, thus causing the turbine wheel 122 and an associated turbine shaft 124 to rotate. One or more gears connect the turbine shaft 124 to the crankshaft 14. Hence, when the turbine wheel 122 is forced to rotate the turbine shaft 124 will provide an additional torque to the crankshaft 14.

The exhaust gas exiting the turbocompound unit 120 flows into an after treatment system 36 which provides filtering and removal of toxic substances, such as NOx, from the exhaust gas before it leaves the internal combustion engine 10 via a tailpipe.

The vehicle system 100 further comprises an exhaust gas recirculation system 130 connecting the air intake line 160 with an exhaust gas line 30. The exhaust gas line 30 extends from an exhaust gas manifold 16 forming the outlet of the cylinders 12, through the turbocharger unit 110, the turbocompound unit 12, and the after treatment system 36, to the ambient. The after treatment system 36 may e.g. include a diesel particle filter and a selective catalytic reduction system as is well known in the art.

The exhaust gas recirculation system 130 includes a gas recirculation line 140 connecting with the exhaust gas line 30 at a position between the cylinders 12 and the turbocharger unit 110, preferably at the manifold 16 as is shown in FIG. 2. The exhaust gas recirculation system 130 further comprises a cooler 150 and a valve 180, arranged along the gas recirculation line 140. The gas recirculation line 140 connects with the air intake line 160 at a position between the charge air cooler 170 and the cylinders 12 of the internal combustion engine 10.

In the embodiment shown in FIG. 2 the valve 180 is a three-way valve being connected to a control unit 190. The control unit 190 is thereby configured to control the operation of the three-way valve 180.

The three-way valve 180 may operate in any of the following three positions; a closed position in which no exhaust gas is allowed to flow through the gas recirculation system 130, a first open position in which exhaust gas is directed to the air intake line 160 downstream the charge air cooler 170, and a second open position in which exhaust gas is directed to the compressor 114 of the turbocharger unit 110.

As can be seen in FIG. 2 when the valve 180 is arranged in the second open position, the exhaust gas is directed to a diffuser 116 of the compressor 114. Such configuration requires the compressor 114 to have a so called "EGR compressor" housing, where the diffuser part of the housing is designed for introduction of recirculated exhaust gas utilizing the low static pressure from the high air velocity. Such compressor housing is known from JP5071427, and will not be described further herein.

The control unit 190 is thus configured to set the position of the three-way valve 180 in any one of the closed position, the first open position, or the second open position. In some embodiments the control unit 190 is configured to set the position of the three-way valve 180 into any intermediate position between the closed position, the first open position, and the second open position.

By controlling the valve 180 it is possible to switch between two different EGR modes. According to the embodiments described herein, controlling the valve 180 is based on the pressure difference between the exhaust gas manifold 16 and the air intake line 160 downstream the charge air cooler 170, i.e. the EGR drive pressure. In a normal EGR mode, i.e. when the EGR drive pressure is sufficient, the exhaust gas is directed to the air intake line 160 downstream the charge air cooler 170. In a low pressure EGR mode, i.e. in operating points where the EGR drive pressure is not high enough for optimal EGR levels, the exhaust gas is instead directed to the compressor 114. Operating points where low pressure EGR mode is preferred may also include some normal operation points as well as heat mode operation and any other point where there are benefits.

Determining the current drive mode may be performed by the control unit 190, comparing the determined pressure difference with a predetermined threshold value. If the determined pressure difference is above the threshold value, normal EGR mode is present and the valve 180 will be set to the first open position. If the determined pressure difference is equal to or below the threshold value, low pressure EGR mode is present and the valve 180 will be set to the second open position. The threshold value may e.g. be predetermined by engine testing, or by other methods available for determining the level at which the EGR is insufficient.

In order to gain extra efficiency by increasing the temperature of the exhaust gas the control unit 190 may be connected to a bypass valve 142 arranged in the air intake line 160 immediately upstream the charge air cooler 170. The control unit 190 is in such embodiment configured to control the bypass valve 142 during heat mode and cold start.

Figure 3:
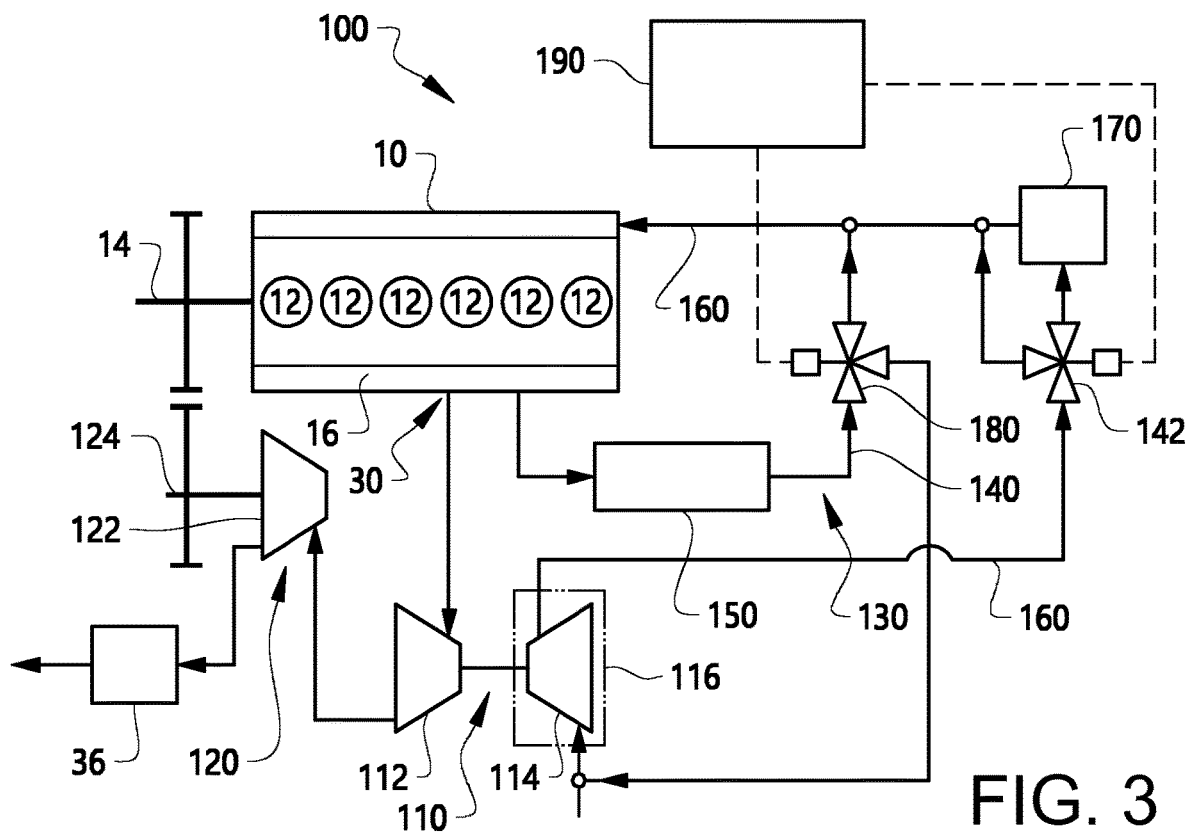
FIG. 3 is a schematic view of a vehicle system according to another embodiment.

In FIG. 3 another embodiment of a vehicle system 100 is shown. As can be seen the vehicle system 100 of FIG. 3 shows great similarities with the vehicle system 100 shown in FIG. 2. Therefore the reference numerals used in these figures all the same. The embodiment of FIG. 3 differs from the embodiment in FIG. 2 in that the exhaust gas is recirculated from the three-way valve 180 to a position upstream the compressor 114 when the valve 180 is arranged in the second open position. In this case the compressor diffuser is of a standard design.

Figure 4:
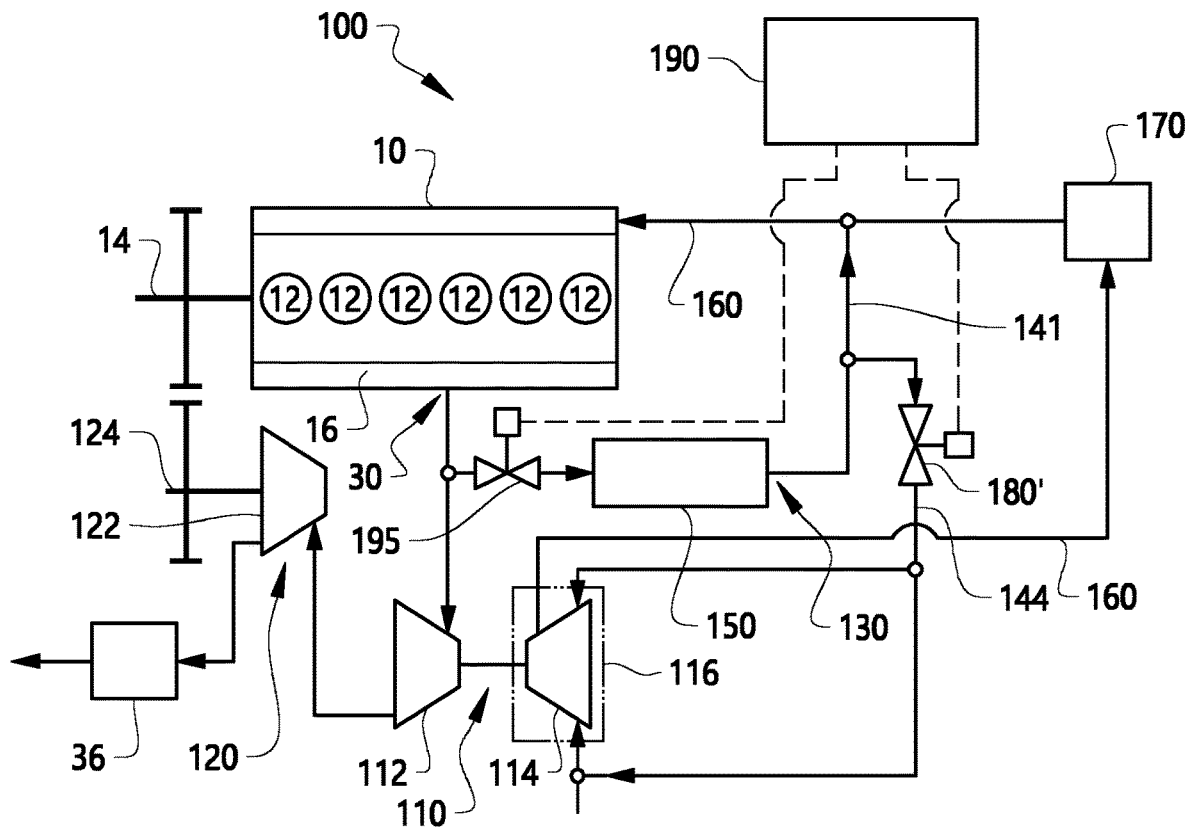
FIG. 4 is a schematic view of a vehicle system according to a yet further embodiment.

A further embodiment of a vehicle system 100 is shown in FIG. 4. In this embodiment the three-way valve 180 is replaced by two separate valves 180', 195. The first valve 195 is a two-way valve being arranged upstream the cooler 150. This valve 195 thus forms a standard EGR valve. The control unit 190 is connected to the EGR valve 195; by opening the EGR valve 195 recirculation of exhaust gas is allowed. As the exhaust gas flows through the EGR valve 195 and the downstream cooler 150, it will be directed to the air intake line 160 downstream the charge air cooler 170. However, the second valve 180' is a two-way valve which is configured to open an auxiliary branch 144 leading to the compressor 114. The valve 180, being controlled by the control unit 190, is thus moveable between a closed position in which exhaust gas is prevented to flow through said valve 180', and an open position in which exhaust gas is directed to the auxiliary branch 144.

The control unit 190 is preferably configured such that the valve 180' is moveable between a plurality of intermediate positions arranged between the closed position and the open position.

As can be seen in FIG. 4 the valve 180' allows the recirculated exhaust gas to be directed to the compressor 114 of the turbocharger unit 110. In a first embodiment the exhaust gas is directed to the compressor housing 116 as explained earlier with reference to FIG. 2; such embodiment requires the compressor housing 116 to be of a specific EGR compressor type. In another embodiment, as explained earlier with reference to FIG. 3, the exhaust gas is recirculated from the valve 180' to a position upstream the compressor 114. In this case the compressor diffuser is of a standard design.

Control of the valve 180' is performed similar to what has been described with respect to the valve 180 (see FIGS. 2 and 3), i.e. the control is based on the pressure difference between the exhaust gas manifold 16 and the air intake line 160 downstream the charge air cooler 170.

Heat mode and heat management are also important factors to consider for reducing fuel consumption. The challenge is normally to increase the temperature at the after treatment system 36 to a temperature high enough for the soot and NOx reduction to function at low load without penalizing the fuel consumption.

Especially for a vehicle system 100 including a turbocompound unit 120 with a small, high efficiency turbine 122 together with a highly efficient power turbine 112 of a turbocharger unit 110, the exhaust temperature becomes low at low load.

One way that has been proven to increase the exhaust gas temperature with an acceptable fuel penalty is to introduce EGR. As already described above, at some operating points the EGR drive pressure is not always sufficient, especially for vehicle systems 100 including a turbocompound unit 120. The described embodiments can therefore be used to switch to introducing EGR to the compressor.

Figure 5:
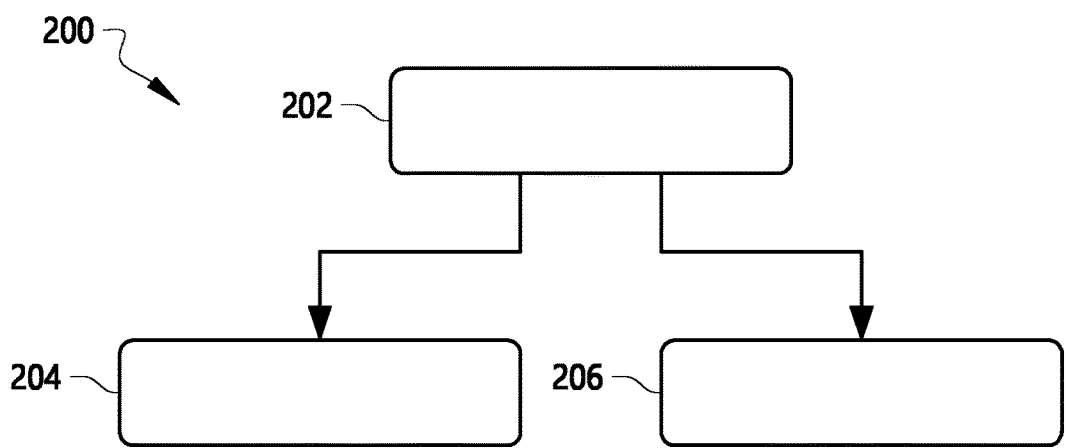
FIG. 5 is a schematic view of a method according to an embodiment.

Now turning to FIG. 5 a schematic view of a method 200 is shown. The method 200 is performed using a vehicle system 100 comprising an internal combustion engine 10 having a turbocharger unit 110 connected thereto, and a turbocompound unit 120 arranged to receive exhaust gas flowing from the turbocharger unit 110. The vehicle system 100 further comprises an exhaust gas recirculation system 130. The method 200 is performed in order to control the exhaust gas flowing through the exhaust gas recirculation system 130, and includes a first step 202 of determining the pressure difference between the exhaust gas manifold and the air intake line downstream the charge air cooler. Determining such pressure difference may be obtained e.g. by real-time measurements, or predictive assumptions, or engine mapping, or any other suitable way (open and/or closed loop). If the determined pressure difference is above a predetermined threshold value the method 200 performs a step 204 of directing the recirculated exhaust gas to an air intake line 160 downstream a charge air cooler 170. If the determined pressure difference is not above the predetermined threshold value the method 200 performs a step 206 of directing the recirculated exhaust gas to a compressor 114 of the turbocharger unit 110.

As has been described above with reference to FIGS. 2-4 the step 206 of directing the recirculated exhaust gas to the compressor 114 of the turbocharger unit 110 is performed by directing the recirculated exhaust gas to a position upstream the compressor 114.

Optionally, the step 206 is performed by directing the recirculated exhaust gas into a diffuser part 116 of the compressor 114 where the velocity of the air creates a lower static pressure and thereby increases the drive pressure for the exhaust gas.

It is to be understood that the present invention is not limited to the embodiments described above and illustrated in the drawings; rather, the skilled person will recognize that many changes and modifications may be made within the scope of the appended claims.

The invention claimed is:

1. A method for a vehicle system comprising an internal combustion engine having a plurality of cylinders, an exhaust gas manifold forming an outlet of the cylinders from which an exhaust gas line extends, the internal combustion engine having a turbocharger unit connected thereto, a turbocompound unit arranged to receive exhaust gas flowing from the turbocharger unit, and an exhaust gas recirculation system comprising a gas recirculation line connecting with the exhaust gas line at a position between the cylinders of the internal combustion engine and the turbocharger unit, the gas recirculation line connecting with an air intake line at a position between a charge air cooler and the cylinders of the internal combustion engine, wherein the method comprises controlling the exhaust gas flowing through the exhaust gas recirculation system by determining a pressure difference between the exhaust gas manifold and the air intake line downstream from the charge air cooler, and, if the determined pressure difference is above a predetermined threshold value directing, by a valve upstream of a compressor of the turbocharger unit, the recirculated exhaust gas to the air intake line downstream the charge air cooler, and, if the determined pressure difference is not above the predetermined threshold value directing, by the valve, the recirculated exhaust gas directly to a compressor housing of the compressor of the turbocharger unit.

2. The method according to claim 1, wherein directing the recirculated exhaust gas to the compressor of the turbocharger unit is performed by directing the recirculated exhaust gas to a position upstream the compressor.

3. The method according to claim 1, wherein directing the recirculated exhaust gas to the compressor of the turbocharger unit is performed by directing the recirculated exhaust gas into a diffuser part of the compressor.

4. The method according to claim 1, further comprising bypassing the charge air cooler by directing the intake air, as well as the exhaust gas previously being directed to the compressor, to a position downstream the charge air cooler.

5. A vehicle system, comprising an internal combustion engine having a plurality of cylinders, an exhaust gas manifold forming an outlet of the cylinders from which an exhaust gas line extends, the internal combustion engine having a turbocharger unit connected thereto and a turbocompound unit arranged to receive exhaust gas flowing from the turbocharger unit, wherein the vehicle system further comprises an exhaust gas recirculation system comprising an exhaust gas recirculation line having a cooler and connecting with the exhaust gas line at a position between the cylinders of the internal combustion engine and the turbocharger unit, the gas recirculation line connecting with an air intake line at a position between a charge air cooler and the cylinders of the internal combustion engine, wherein the exhaust gas recirculation line further comprises a valve arranged upstream of a compressor of the turbocharger unit and downstream the cooler of the gas recirculation line and configured to direct at least a part of the exhaust gas flowing through the exhaust gas recirculation line directly to a compressor housing of the compressor of the turbocharger unit, and the vehicle system further comprises a control unit being connected to the valve and configured to control the valve based on a pressure difference between the exhaust gas manifold and the air intake line downstream the charge air cooler.

6. The vehicle system according to claim 5, wherein the valve is configured to direct at least a part of the exhaust gas flowing through the exhaust gas recirculation line to a position upstream the compressor of the turbocharger unit.

7. The vehicle system according to claim 5, wherein the valve is configured to direct the exhaust gas flowing through the exhaust gas recirculation line to a diffuser of the compressor of the turbocharger unit.

8. The vehicle system according to claim 5, wherein the air intake line is provided with the valve arranged upstream the charge air cooler and configured to direct the intake air, as well as the exhaust gas to a position downstream the charge air cooler.

9. The vehicle system according to claim 8, wherein the control unit is further configured to control the valve.

10. The vehicle system according to claim 5, wherein the valve is a three-way valve being moveable between a closed position in which exhaust gas is prevented to flow through the valve, a first position in which exhaust gas is directed to the air intake line downstream from the charge air cooler, and a second position in which exhaust gas is directed to the compressor of the turbocharger unit.

11. The vehicle system according to claim 10, wherein the valve is moveable between a plurality of intermediate positions arranged between the closed position, the first position, and the second position.

12. The vehicle system according to claim 5, wherein the exhaust gas recirculation line comprises a main branch connecting to the air intake line downstream the charge air cooler, and an auxiliary branch directing recirculated exhaust gas to the compressor, wherein the valve is a two-way valve being moveable between a closed position in which exhaust gas is prevented to flow through the valve, and an open position in which exhaust gas is directed to the auxiliary branch.

13. The vehicle system according to claim 12, further comprising a recirculation valve arranged upstream from the cooler.

14. The vehicle system according to claim 12, wherein the valve is moveable between a plurality of intermediate positions arranged between the closed position and the open position.

15. For a vehicle system comprising an internal combustion engine having a plurality of cylinders, an exhaust gas manifold forming an outlet of the cylinders from which an exhaust gas line extends, the internal combustion engine having a turbocharger unit connected thereto, a turbocompound unit arranged to receive exhaust gas flowing from the turbocharger unit, and an exhaust gas recirculation system comprising a gas recirculation line connecting with the exhaust gas line at a position between the cylinders of the internal combustion engine and the turbocharger unit, the gas recirculation line connecting with an air intake line at a position between a charge air cooler and the cylinders of the internal combustion engine, a non-transitory computer-readable storage medium comprising a computer program product including instructions to cause at least one processor to:

- control the exhaust gas flowing through the exhaust gas recirculation system by determining a pressure difference between the exhaust gas manifold and the air intake line downstream from the charge air cooler;
- if the determined pressure difference is above a predetermined threshold value, use a valve upstream of a compressor of the turbocharger unit to direct recirculated exhaust gas to the air intake line downstream from the charge air cooler; and,
- if the determined pressure difference is not above the predetermined threshold value, direct the recirculated exhaust gas directly to a compressor housing of the compressor of the turbocharger unit.

\* \* \* \* \*